United States Patent
Blosch et al.

(10) Patent No.: US 6,173,820 B1
(45) Date of Patent: Jan. 16, 2001

(54) ELECTRIC-MOTOR BRAKE APPARATUS

(75) Inventors: Georg Blosch, Murr; Dieter Blattert, Kirchheim/Neckar, both of (DE)

(73) Assignee: Robert Bosch GmbH, Stuttgart (DE)

(*) Notice: Under 35 U.S.C. 154(b), the term of this patent shall be extended for 0 days.

(21) Appl. No.: 09/194,615

(22) PCT Filed: May 14, 1997

(86) PCT No.: PCT/DE97/00991
§ 371 Date: Dec. 9, 1999
§ 102(e) Date: Dec. 9, 1999

(87) PCT Pub. No.: WO97/45653
PCT Pub. Date: Dec. 4, 1997

(30) Foreign Application Priority Data

May 29, 1996 (DE) .............................................. 196 21 533

(51) Int. Cl.[7] .................................................. B60L 7/00
(52) U.S. Cl. .......................................... 188/158; 188/71.8
(58) Field of Search .................................. 188/158, 71.8, 188/162, 196 R, 71.1, 72.1, 72.8, 161, 198

(56) References Cited

U.S. PATENT DOCUMENTS

| | | | |
|---|---|---|---|
| 4,159,754 | * 7/1979 | Airheart et al. | 188/71.8 |
| 4,180,146 | * 12/1979 | Airheart | 188/71.8 |
| 4,476,965 | * 10/1984 | Brown, Jr. et al. | 188/72.3 X |
| 5,769,189 | * 6/1998 | Heibel et al. | 188/156 |
| 6,012,556 | * 1/2000 | Blosch et al. | 188/71.8 |

* cited by examiner

*Primary Examiner*—Matthew C. Graham
*Assistant Examiner*—Melanie Talavera
(74) *Attorney, Agent, or Firm*—Ronald E. Greigg; Edwin E. Greigg

(57) ABSTRACT

The invention relates to a brake apparatus with an electric service motor, which serves to actuate the brake via an actuating device. To enable setting an air clearance, the apparatus includes a readjuster for setting the air clearance, the brake is actuated with the readjuster and then reversed by a defined length. To realize a parking braking function, the apparatus includes a parking brake that can be repositioned from a released position to a braking position and that acts on the actuating device.

6 Claims, 1 Drawing Sheet

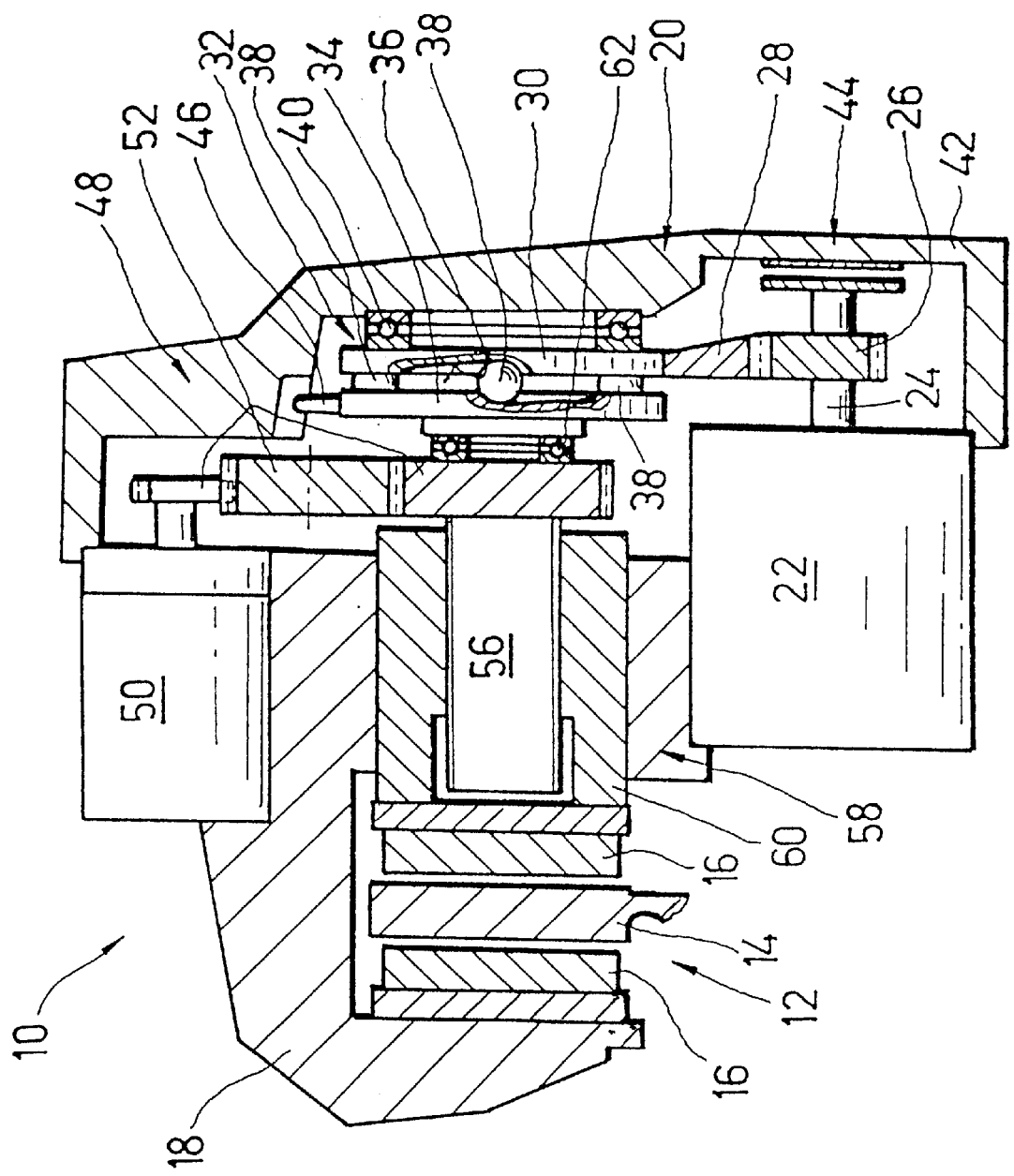

ELECTRIC-MOTOR BRAKE APPARATUS

PRIOR ART

The invention relates to a apparatus for a vehicle.

One such brake apparatus is known from German Patent Disclosure DE 42 29 042 A1. It has an electric motor which via toothed gearing drives a spindle of a spindle drive to rotate; the spindle drive converts the rotating driving motion into a linear motion for pressing a brake lining against a brake disk, as the brake body. The known brake apparatus also has an emergency actuating device, with which the brake apparatus can be actuated if its electric motor fails. The known brake apparatus has the disadvantage of lacking any capability of readjusting an air clearance between the brake lining and the brake disk as the brake lining becomes increasingly worn. As a consequence, the actuation travel and thus also the time that elapses from when the braking operation is set into motion until the brake grips, become longer with increasing wear of the brake lining. Another disadvantage of the known brake apparatus is that because of the construction of its emergency actuating device, the brake apparatus cannot be released if its electric motor, or its power supply, should fail while the brake is actuated.

From European Patent Disclosure EP 0 246 770 A3, a brake actuating device for a railroad brake is known. It has a first electric motor that drives a first spindle drive, whose spindle is intended to press a brake shoe against a railroad carriage wheel. The first electric motor with the first spindle drive serve to overcome the air clearance. The known brake actuating device also has a second electric motor for driving a second spindle drive, whose spindle nut, with a long lever arm, engages a single-armed lever braced against the frame. With a short lever arm, the lever engages the first spindle drive, so that the entire first spindle drive can be displaced with great force via the lever. This displacement motion serves to bring to bear a braking force.

The known brake actuating device has the disadvantage of not being embodied for readjusting the air clearance. It has the further disadvantage that if its first electric motor fails, the air clearance can no longer be overcome, and thus no further braking action is attainable. Still another disadvantage of the known brake actuating device is that if its second electric motor fails, only minimal braking force can then be brought to bear with the first electric motor, and that it can be released with the first electric motor only if this first electric motor is substantially large in its dimensions.

ADVANTAGES OF THE INVENTION

The brake apparatus of the invention having the characteristics of claim 1 has a readjuster with an electric readjusting motor, with which an intended air clearance between the brake lining and brake body can be set while the brake apparatus is released. In this way, a constant air clearance, which independent of brake lining wear, and thus a constant actuation travel of the brake apparatus are assured. Still another advantage of the brake apparatus at the invention is that in the event of failure of its actuating device, it can be released with the readjuster. The term "failure" means a failure of the actuating motor or of its power supply, or a mechanical defect of the actuating device that blocks it. In addition, the invention has the advantage that with the readjusting motor and the readjuster, in the event of failure of the actuating device, a brake force can be generated and the vehicle can be braked even if this brake force, depending on the design of the readjusting motor and of the readjuster, is less than a maximum braking force attainable with the actuating device.

BRIEF DESCRIPTION OF THE DRAWING

The invention will be described in further detail below in terms of an exemplary embodiment shown in the drawing. The sole drawing schematically shows a brake apparatus of the invention.

DESCRIPTION OF THE EXEMPLARY EMBODIMENT

The brake apparatus 10 according to the invention and shown in the drawing has a disk brake 12 of the brake disk 14 as its brake body, of which in the drawing only a fragment in the circumferential region is shown, and with two brake jaws 16 with brake linings. The brake jaws 16 are received in a manner known per se in a floating caliper 18.

The brake apparatus 10 has an actuating device 20, which can be derivable with an electric service motor 22: A pinion 26 is mounted in a manner fixed against relative rotation on a drive shaft 24 of the service motor 22. The pinion meshes with a toothed quadrant 28, that is, a toothed ring, which extends over only a limited angular range. The toothed quadrant 28 is fixedly mounted on the circumference of a first ramp disk 30 of a roller body ramp mechanism 32. The roller body ramp mechanism 32 has two circular or round ramp disks 30, 34 spaced apart somewhat from one another but coaxially parallel. In end faces toward one another, they have ramp tracks 36 in the form of grooves that extend in the circumferential region of the ramp disks 32, 34 circumferentially over a limited circumferential angle. The ramp tracks 36 have a pitch; that is, their depth varies continuously over the circumferential angle. The ramp tracks 36 thus form short segments of screw tracks. Balls 38 or roller bodies, which keep the ramp disks 30, 34 spaced apart from one another, are received in the ramp tracks 36. By rotating the two ramp disks 30, 34 counter to one another, their spacing from one another can be varied. The design of the roller body ramp mechanism 30 (which in the exemplary embodiment shown is a ball ramp mechanism) is similar to an axial ball bearing, except that the ramp disks for the roller bodies have a pitch and extend over only a limited circumferential angle. The roller bodies may for instance also be conical. A cross section through the ramp tracks is embodied as complementary to the roller bodies.

The second ramp disk 34 has a radially protruding cog 46, which meshes with the housing 42 and prevents the second ramp disk 34 from rotating together with the first ramp disk 30.

The ball ramp mechanism 32 has the advantage that it runs very smoothly because of the balls 38 that roll between its ramp disks 30, 34; that is, it operates at high efficiency. Its first ramp disk 30 is braced via an axial ball bearing 40 against a housing 42 fixedly mounted on the floating caliper 18. By driving the first ramp disk 30 to rotate by means of the service motor 22, the spacing between the two ramp disks 30, 34 is increased; that is, the second ramp disk 34 is forced away from the first ramp disk 30, and the ball ramp mechanism 32 converts a rotary drive motion into a linear motion. The second ramp disk 34 presses the brake jaw 16 shown on the right of the brake disc in the drawing against the brake disk 14, and via a reaction force, the floating caliper 18 in a manner known per se presses the other brake jaw 16 against the other side of the brake disk 14, so that a brake force is generated. To release the disk brake 12, the service motor 22 is operated in the opposite direction of rotation.

To enable maintaining a brake force, once it has been brought to bear, even without supplying power in the form of electrical current to the service motor 22, an electromagnetically actuatable brake 44, manifold versions of which are known per se to one skilled in the art, is mounted on the drive shaft 24 of the service motor. Both in its released position and in its braking position, the brake 44 can be self-holding (bistable); it is merely switched over magnetically between these two positions. With it, via the drive shaft 24, the actuating device 20 can be blocked, so that a brake force that has been brought to bear is maintained. As a result, the brake apparatus 10 of the invention can also be used as a parking brake, without requiring current to maintain the brake force (in the bistable variant).

Even in conventional braking during driving, that is, if the brake apparatus 10 of the invention is used as a service brake, the brake 44 can be switched over to its braking position, so that a brake force that has been brought to bear is maintained, and the service motor 22 can be turned off if and as long as braking at constant brake force is occurring. This has the advantage that an on-board electrical system of a vehicle equipped with the brake apparatus 10 of the invention, and the service motor 22 of the brake apparatus 10, are relieved, the latter being in particular thermally relieved.

The switchover of the electromagnetically actuatable brake 44 and the switching off of the service motor 22 are preferably done if brake force changes within a fixed time slot are within a predetermined range. This range is selected such that the brake force can be assumed to be constant.

If the brake force exceeds or drops below the predetermined range, then the brake 44 is switched over to its released position, and the brake apparatus 10 is actuated more strongly or weakly with the service motor 22. A constant brake force over a time slot occurs for instance in panic braking, or during an antilock, traction control, or dynamic driving control mode.

For setting an air clearance, that is, a total gap between the brake jaws 16 and the brake disk 14, the brake apparatus 10 of the invention has a readjuster 48, which can be driven with an electric readjusting motor 50. The readjusting motor 50 is connected to a power supply that is independent of the power supply of the service motor 22. With it, a spindle 56 of a spindle drive 58 can be driven via a gear wheel gear system 52.

As a result, a spindle nut 60 is axially displaced on the spindle 56. The spindle 56 is braced against the second ramp disk 34 via an axial ball bearing 62, and the spindle nut 60 presses against the brake jaw 16 shown on the right in the drawing. The ball ramp mechanism 32 accordingly presses the brake jaw 16 against the brake disk 12 via the spindle drive 58. The spacing between the second ramp disk 34 and the brake jaw 16, and thus the air clearance, can be set by adjusting the spindle drive 58.

For setting the air clearance and readjusting the air clearance if the brake linings become worn, the two brake jaws 16, with the actuating device 20 restored to its earlier position, are brought into contact with the brake disk 14 by the readjuster 28. This can be ascertained from the sharply rising current consumption of the readjusting motor 50, as soon as the brake jaws 16 come to rest on the brake disk 14 and further adjustment demands an abrupt rise in force. Once the brake jaws 16 are in contact with the brake disk 14, they are reversed by a certain distance, namely the air clearance, by the readjuster 48. This can be done by operating the readjusting motor 50 in the reverse direction for a fixed period of time.

It is also possible to release the brake apparatus 10 with the readjuster 48 in the event of a defect, that is, if the service motor 22 or its power supply fails, for instance if the actuating device 20 is blocked because of a mechanical defect, or if the parking brake 44 cannot be released. Furthermore, a brake force can be built up at the disk brake 12 with the readjuster 48 in the event of a failure, so that no matter what, it is possible to actuate the brake apparatus 10, although perhaps with a reduced maximum braking force.

The foregoing relates to a preferred exemplary embodiment of the invention, it being understood that other variants and embodiments thereof are possible within the spirit and scope of the invention, the latter being defined by the appended claims.

What is claimed is:

1. A brake apparatus (10) for a vehicle, comprising an actuating device (20) which includes an electric service motor (22) and with which a brake lining (16) can be pressed against a brake body (14), and having a readjuster (48), which has a spindle drive (58) that can be driven by an electric readjusting motor (50) and with which an air clearance between the brake lining (16) and the brake body (14) can be set, the actuating device (20) has a roller body ramp mechanism (32), which can be driven by the electric service motor (22) and which converts a limited rotary motion into a linear motion for overcoming the air clearance and pressing the brake lining (16) against the brake body (14), and that with the electric readjusting motor (50), a spindle (56) of the spindle drive (58) disposed between the roller body ramp mechanism (32) and the brake lining (16) can be driven to set the air clearance.

2. A brake apparatus of claim 1, in which the actuating device (20) can be locked with a parking brake (44).

3. The brake apparatus in accordance with claim 2, in which the parking brake (44) is self-holding both in a released position and in a braking position, and that the parking brake (44) can be switched over magnetically from the released position into the braking position and back again.

4. A method for setting an air clearance of a brake apparatus (10) for a vehicle, having an actuating device (20) which includes an electric service motor (22) and with which a brake lining (16) can be pressed against a brake body (14), and having a readjuster (48), which has a spindle drive (58) that can be driven by an electric readjusting motor (50) and with which an air clearance between the brake lining (16) and the brake body (14) can be set, which comprises:

releasing the brake apparatus (10), activating the readjusting motor (50) to operate the readjuster (48), until the brake lining (16) contacts the brake body (14), and reactivating the readjusting motor (50) to execute a fixed reverse rotary motion.

5. A method for operating a brake apparatus of claim 4, in which for holding a constant braking force, applied with the service motor (22), operating a parking brake (44) into a braking position, and then turning the service motor (22) off.

6. A method for operating a brake apparatus of claim 5, which comprises switching over said parking brake magnetically from a released position into a braking position and back to a released position.

\* \* \* \* \*